United States Patent
Horovitz

(10) Patent No.: US 10,547,523 B2
(45) Date of Patent: Jan. 28, 2020

(54) SYSTEMS AND METHODS FOR EXTRACTING MEDIA FROM NETWORK TRAFFIC HAVING UNKNOWN PROTOCOLS

(71) Applicant: Verint Systems Ltd., Herzelia, Pituach (IL)

(72) Inventor: Itsik Horovitz, Holon (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 456 days.

(21) Appl. No.: 14/926,675

(22) Filed: Oct. 29, 2015

(65) Prior Publication Data

US 2016/0142273 A1    May 19, 2016

Related U.S. Application Data

(63) Continuation of application No. 14/223,653, filed on Mar. 24, 2014, now Pat. No. 9,197,523, which is a continuation of application No. 13/155,343, filed on Jun. 7, 2011, now Pat. No. 8,681,640.

(51) Int. Cl.
*H04L 12/26* (2006.01)
*H04L 29/08* (2006.01)

(52) U.S. Cl.
CPC ............ *H04L 43/062* (2013.01); *H04L 43/08* (2013.01); *H04L 43/18* (2013.01); *H04L 67/02* (2013.01); *H04L 67/2828* (2013.01)

(58) Field of Classification Search
CPC .............................. H04L 43/062; H04L 43/08
USPC ....................................................... 709/224
See application file for complete search history.

(56) References Cited

U.S. PATENT DOCUMENTS

| | | | |
|---|---|---|---|
| 5,287,374 A * | 2/1994 | Parr | H03M 13/35 375/343 |
| 5,684,988 A | 11/1997 | Pitchaikani et al. | |
| 5,689,442 A | 11/1997 | Swanson et al. | |
| 5,838,821 A * | 11/1998 | Matsubara | G06T 9/00 382/190 |
| 5,991,714 A | 11/1999 | Shaner | |
| 6,404,857 B1 | 6/2002 | Blair et al. | |
| 6,718,023 B1 | 4/2004 | Zolotov | |
| 6,757,361 B2 | 6/2004 | Blair et al. | |
| 7,216,162 B2 | 5/2007 | Amit et al. | |
| 7,466,816 B2 | 12/2008 | Blair | |

(Continued)

OTHER PUBLICATIONS

Aho, Alfred V., et al., "Efficient String Matching: An Aid to Bibliographic Search," Communication of the ACM, Jun. 1975, vol. 18, No. 6, pp. 333-340.

(Continued)

*Primary Examiner* — Ronald B Abelson
(74) *Attorney, Agent, or Firm* — Meunier Carlin & Curfman LLC

(57) ABSTRACT

Methods and systems for analyzing network traffic. An analysis system receives network traffic, which complies with a certain protocol. The received network traffic carries a data item, which may be of value to an analyst. In order to access the data item in question, the analysis system automatically identifies the media type of the data item, by processing the network traffic without decoding the protocol. The analysis system identifies the media type irrespective of the protocol in order to avoid the computational complexity involved in decoding the protocol.

16 Claims, 2 Drawing Sheets

(56) References Cited

U.S. PATENT DOCUMENTS

| | | | |
|---|---|---|---|
| RE40,634 E | 2/2009 | Blair et al. | |
| 7,587,041 B2 | 9/2009 | Blair | |
| 2002/0041547 A1* | 4/2002 | Katayama | G11B 7/00 |
| 2002/0191116 A1* | 12/2002 | Kessler | H04N 5/38 |
| 2003/0023428 A1* | 1/2003 | Chang | G10L 19/008 704/201 |
| 2003/0035008 A1* | 2/2003 | Fuller, III | G06F 8/34 715/771 |
| 2003/0189642 A1 | 10/2003 | Bean et al. | |
| 2004/0083258 A1* | 4/2004 | Haneda | G06F 15/16 |
| 2004/0183896 A1* | 9/2004 | Takamine | H04N 7/14 |
| 2005/0009504 A1* | 1/2005 | Kyung | H04W 8/26 455/411 |
| 2005/0213826 A1 | 9/2005 | Neogi | |
| 2005/0238023 A1 | 10/2005 | Robertson et al. | |
| 2005/0289181 A1 | 12/2005 | Deninger et al. | |
| 2007/0038637 A1 | 2/2007 | Taneja et al. | |
| 2007/0076680 A1* | 4/2007 | Amram | H04L 1/0083 370/349 |
| 2008/0014873 A1 | 1/2008 | Krayer et al. | |
| 2008/0196077 A1* | 8/2008 | Basse | H04N 21/6175 725/116 |
| 2008/0261192 A1 | 10/2008 | Huang et al. | |
| 2008/0285464 A1 | 11/2008 | Katzir | |
| 2009/0063665 A1* | 3/2009 | Bagepalli | G06F 15/177 |
| 2009/0132942 A1* | 5/2009 | Santoro | G06F 3/0481 715/765 |
| 2009/0190479 A1* | 7/2009 | Parsons | H04L 12/14 370/241 |
| 2012/0281536 A1* | 11/2012 | Gell | H04W 28/06 370/235 |

OTHER PUBLICATIONS

Altshuler, Y., et al., "How Many Makes a Crowd? On the Evolution of Learning as a Factor of Community Coverage," LNCS 7227, 2012, pp. 43-52.
Altshuler, Y., et al., "Incremental Learning with Accuracy Prediction of Social and Individual Properties from Mobile-Phone Data," IEEE, 2011, 10 pages.
Altshuler, Y., et al., "Trade-Offs in Social and Behavioral Modeling in Mobile Networks," LNCS 7812, 2013, pp. 412-423.
Argamon, S., et al., "Automatically Profiling the Author of an Anonymous Text," Communication of the ACM, vol. 52, No. 2, Feb. 2009, pp. 119-123.
Argamon, S., et al., "Gender, Genre, and Writing Style in Formal Written Texts," Text & Talk, vol. 23, Issue 3, 2003, 32 pages.
Atkinson, M., et al., "Near Real Time Information Mining in Multilingual News," World Wide Web Conference, Apr. 20-24, 2009, 2 pages.
Cloudshield, Inc., "Lawful Intercept Next-Generation Platform," 2009, 6 pages.
Coffman, T., et al., "Graph-Based Technologies for Intelligence Analysis," CACM, Mar. 2004, 12 pages.
Corney, M., et al. "Gender-Preferential Text Mining of E-mail Discourse," Proceedings of the 18the Annual Computer Security Applications Conference, 2002, 8 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
De Vel, O., et al., "Language and Gender Author Cohort Analysis of E-mail for Computer Forensics," Defence Science and Technology Organisation, Australia, 2002, 16 pages.
Eagle, N., et al., "Inferring friendship network structure by using mobile phone data," PNAS, vol. 106, No. 36, 2009, pp. 15274-15278.
Estival, D., et al., "Author Profiling for English Emails," Proceedings of the 10th Conference of the Pacific Association for Computational Linguistics, 2007, pp. 263-272.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Goldfarb, Eithan, "Mass Link Analysis: Conceptual Analysis," Jun. 24, 2007, Version 1.1, 21 pages.
Goswami, S., et al., "Stylometric Analysis of Bloggers' Age and Gender," Proceedings of the Third International ICWSM Conference, 2009, pp. 214-217.
Lakhina, A., et al., "Mining Anomalies Using Traffic Feature Distributions," SIGCOMM, 2005, pp. 217-228.
Mohrehkesh, S., et al., "Demographic Prediction of Mobile User from Phone Usage," Proceedings Mobile Data Challenge by Nokia Workshop, Newcastle, United Kingdom, 2012, 4 pages.
Navarro, Gonzalo, et al., "Flexible Pattern Matching in Strings: Practical On-Line Search Algorithms for Texts and Biological Sequences," Cambridge University Press, 2002, 166 pages.
Netronome SSL Inspector Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.
Tongaonkar, Alok S., "Fast Pattern-Matching Techniques for Packet Filtering," Stony Brook University, May 2004, 44 pages.

(56) References Cited

OTHER PUBLICATIONS

Verint Systems Inc., "Mass Link Analysis: Solution Description," Dec. 2008, 16 pages.

Yu, Fang, et al., "Fast and Memory-Efficient Regular Expression Matching for Deep Packet Inspection," ANCS'06, San Jose, California, Dec. 3-5, 2006, 10 pages.

Yu, Fang, et al., "Gigabit Rate Packet Pattern-Matching Using TCAM," Proceedings of the 12th IEEE International Conference on Network Protocols (ICNP'04), 2004, 10 pages.

* cited by examiner

SYSTEMS AND METHODS FOR EXTRACTING MEDIA FROM NETWORK TRAFFIC HAVING UNKNOWN PROTOCOLS

CROSS-REFERENCE TO RELATED APPLICATION

This Application is Continuation of U.S. patent application Ser. No. 14/223,653, filed Mar. 24, 2014, entitled "Systems and Methods for Extracting Media from Network Traffic Having Unknown Protocols," which is a Continuation of U.S. patent application Ser. No. 13/155,343, filed Jun. 7, 2011, now U.S. Pat. No. 8,681,640, entitled "Systems and Methods for Extracting Media from Network Traffic Having Unknown Protocols," all of which are hereby incorporated by reference in their entirety.

FIELD OF THE DISCLOSURE

The present disclosure relates generally to communication analysis, and particularly to methods and systems for identifying media in network traffic.

BACKGROUND OF THE DISCLOSURE

Various systems and applications are used for exchanging data over communication networks, such as the Internet. Such systems and applications may use various kind of protocols, and may carry data of various media types, such as text, audio, still images or video.

SUMMARY OF THE DISCLOSURE

An embodiment that is described herein provides a method, including:

receiving, in a computerized analysis system, network traffic, wherein the network traffic complies with a protocol and carries a data item of a respective media type, and wherein the protocol is associated with a layer that is higher than layer 4 of the Open System Interconnection (OSI) reference model;

automatically identifying the media type by processing the network traffic without decoding the protocol; and extracting at least part of the data item responsively to the identified media type.

In some embodiments, the protocol is not decodable by the analysis system. In an embodiment, the data item includes a sequence of bytes, and identifying the media type includes identifying that the sequence of bytes includes valid text. Identifying the valid text may include identifying a character set that is used for constructing the sequence of bytes. In another embodiment, identifying the valid text includes verifying at least one criterion selected from a group of criteria consisting of:

the sequence is longer than a predefined minimal length;
at least a predefined portion of the bytes in the sequence represent letters;
the sequence includes only bytes representing valid displayable characters; and
the sequence includes at least one consecutive run of multiple alphanumerical characters.

In a disclosed embodiment, identifying the valid text includes assessing a statistical property of the bytes, and identifying that the text is valid responsively to the assessed statistical property. Assessing the statistical property may include assessing an occurrence frequency of a given character in the sequence of the bytes. Additionally or alternatively, assessing the statistical property may include assessing a measure of randomness of the sequence of the bytes. Further additionally or alternatively, assessing the statistical property may include comparing a first statistical distribution of the bytes in the sequence with a second statistical distribution of characters in a given language.

In some embodiments, identifying the media type includes identifying in the network traffic a file type that is associated with the media type. In an embodiment, identifying the file type includes detecting a byte pattern that is characteristic of the file type. In a disclosed embodiment, the data item includes a sequence of bytes, and identifying the media type includes identifying that the sequence of bytes includes visual information.

In another embodiment, the data item includes a sequence of bytes, and identifying the media type includes identifying that the sequence of bytes includes digitized audio. In still another embodiment, the data item includes a sequence of bytes, and identifying the media type includes identifying that the sequence of bytes includes encrypted information. In an embodiment, the data item includes a sequence of bytes, and identifying the media type includes identifying that the sequence of bytes includes compressed information. In an embodiment, extracting the data item includes selecting a modality for presenting the data item responsively to the identified media type, and presenting the data item to an operator using the selected modality.

There is additionally provided, in accordance with an embodiment that is described herein, apparatus, including:

an interface configured to receive network traffic, wherein the network traffic complies with a protocol and carries a data item of a respective media type, and wherein the protocol is associated with a layer that is higher than layer 4 of the Open System Interconnection (OSI) reference model; and a processor, which is configured to automatically identify the media type by processing the network traffic without decoding the application-layer protocol, and to extract at least part of the data item responsively to the identified media type.

The present disclosure will be more fully understood from the following detailed description of the embodiments thereof, taken together with the drawings in which:

DETAILED DESCRIPTION OF EMBODIMENTS

Overview

Data that is sent over a communication network often comprises data items of various media types, such as text, audio and visual information (e.g., images or video). In some cases, parts of the data may be encrypted. The data is typically sent over the network using a certain application-layer protocol, such as the Hyper-Text Transfer Protocol (HTTP), File Transfer Protocol (FTP) or Real Time Protocol (RTP), to name just a few examples. The receiving party typically decodes the application-layer protocol in order to determine the media type or types and extract the data.

In some applications, an external system (or other third party that is not one of the designated participants in the communication) attempts to analyze (decode) the network traffic. The external system may be unable to complete the task, since the protocols and the applications involved may not be known to it. For example, an analysis system may receive network traffic from a communication network and attempt to extract and analyze the data conveyed by the traffic. In some cases, the analysis system may not be able to decode a given protocol, e.g., because the system does not support or does not recognize the protocol.

Embodiments that are described herein provide improved methods and systems for analyzing network traffic. In some embodiments, an analysis system is connected to a communication network, such as the Internet. The analysis system receives network traffic, which complies with a certain protocol. The received network traffic carries a data item, which may be of value to an analyst.

In order to access the data item in question, the analysis system automatically identifies the media type of the data item, by processing the network traffic irrespective of the protocol. In some embodiments, the protocol is not decodable by the analysis system. In other embodiments, the analysis system identifies the media type irrespective of the protocol in order to avoid the computational complexity involved in decoding the protocol.

Several example methods for identifying text, image and/or encrypted traffic information are described herein. The disclosed techniques typically regard the network traffic as a stream of bytes, and attempt to detect in the stream characteristics that are indicative of the media type. As such, these techniques do not rely on knowledge of the protocol. Having identified the media type of the data item, the analysis system extracts at least part of the data item and presents it accordingly.

The methods and systems described herein provide the ability to automatically analyze, prioritize and present large volumes of network traffic, even for unsupported or unrecognized protocols. Rather than providing the analyst with a raw stream of bytes, the extracted data can be presented in a manner that matches its media type.

System Description

Figure 1:
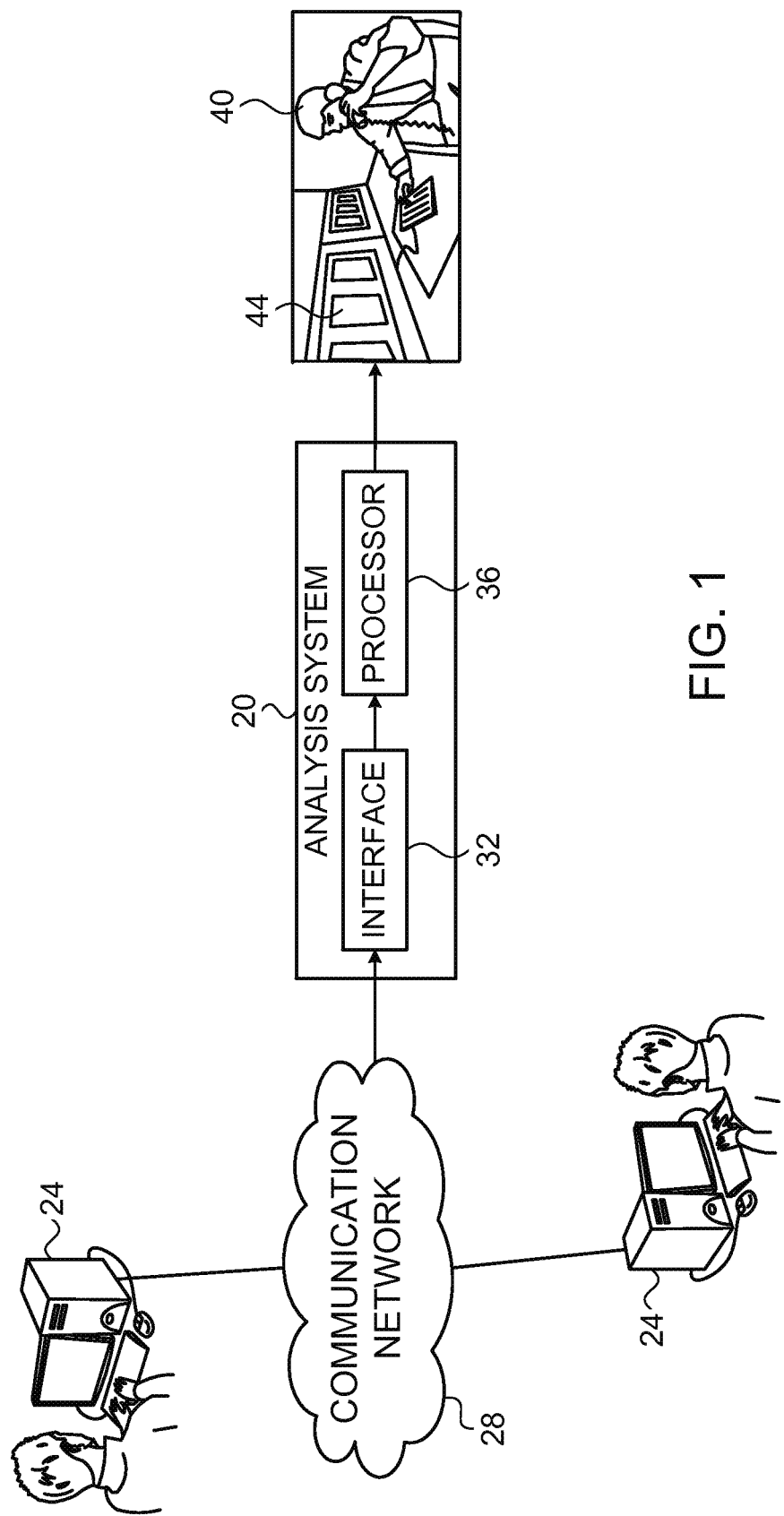
FIG. 1 is a block diagram that schematically illustrates a system for analyzing network traffic, in accordance with an embodiment of the present disclosure.

FIG. 1 is a block diagram that schematically illustrates a computerized system 20 for analyzing network traffic, in accordance with an embodiment of the present disclosure. System 20 is connected to a communication network 28, and receives from network 28 network traffic that is exchanged between network users 24. Network 28 may comprise a Wide-Area Network (WAN) such as the Internet, or any other suitable network. Typically although not necessarily, network 28 comprises an Internet Protocol (IP) network.

Users 24 communicate over network 28 using various protocols. Example protocols are various proprietary protocols used by peer-to-peer applications (e.g., eMule or BitTorent), gaming applications and chat applications. Other example protocols are the Hyper-Text Transfer Protocol (HTTP), File Transfer Protocol (FTP), Real Time Protocol (RTP), Transmission Control Protocol (TCP) or User Datagram Protocol (UDP). Alternatively, any other suitable protocol can also be used. Using these protocols, users 24 exchange various kinds of data items of various media types. Example media types that can be used are text, audio, visual information (e.g., still images or video), encrypted content, or any other suitable media type.

System 20 receives communication traffic (e.g., communication packets) from network 28, and analyzes the traffic in order to extract information that is of value. In particular, system 20 automatically identifies the media types of data items in the received traffic irrespective of the underlying protocol, using methods that are described below. Systems of this sort can be used, for example, in test equipment, network probes, Quality-of-Service (QoS) systems, Digital Rights Management (DRM) systems, or in any other suitable system or application.

System 20 comprises a network interface 32 for receiving the network traffic from network 28, and a processor 36 that carries out the methods described herein. In some embodiments, system 20 extracts the data items in accordance with the identified media types. The extracted data items are presented to an operator 40 using a suitable output device, such as a display 44. (When the data items comprise audio, the output device may comprise a speaker or headset, for example.)

The system configuration shown in FIG. 1 is an example configuration, which is chosen purely for the sake of conceptual clarity. In alternative embodiments, any other suitable system configuration can also be used. For example, the functions of system 20 can be integrated with other analysis functions. Certain elements of system 20 can be implemented using hardware, such as using one or more Application-Specific Integrated Circuits (ASICs) or Field-Programmable Gate Arrays (FPGAs). Additionally or alternatively, certain elements of system 20 can be implemented using software, or using a combination of hardware and software elements.

Typically, processor 36 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Media Type Identification Methods

Identifying the media type of a data item irrespective of the protocol can be advantageous in various scenarios. In some practical cases, system 20 receives network traffic, which complies with a protocol that is not decodable by the system. For example, system 20 may not support decoding of one or more protocols that are used in network 28. In other cases, system 20 may fail to recognize a certain protocol, even if it supports its decoding. Further alternatively, system 20 may be unable to decode a certain protocol for any other reason.

In other cases, the protocol is decodable by system 20, but the system nevertheless identifies the media type without decoding the protocol (or at least without fully decoding the protocol). This technique reduces or eliminates the computational complexity that is associated with decoding the protocol, and therefore improves the system performance. For example, refraining from decoding the protocol can enable the system to analyze considerably higher traffic volumes.

In the embodiments described herein, the non-decodable protocol in question comprises an application-layer protocol, i.e., a protocol that is associated with layer 7 of the Open System Interconnection (OSI) reference model. Example application-layer protocols comprise HTTP, FTP and RTP, among others. In alternative embodiments, the protocol is associated with any layer that is higher than the transport layer, i.e., higher than layer 4 of the OSI model. In some scenarios, a user may attempt to hide the real application he or she is using, by communicating through proxies. In this sort of scenario, the traffic may appear to be HTTP traffic when in fact it is associated with a different protocol or application. Further alternatively, the protocol may comprise any other suitable protocol.

In some embodiments, processor 36 automatically identifies the media types of respective data items in the received network traffic, irrespective of the protocols that are used for sending the traffic. Typically although not necessarily, processor 36 regards the network traffic of a certain flow or connection as a stream of bytes. Processor 36 attempts to find in the byte stream characteristics that are indicative of a certain media type (e.g., textual information, image information or encrypted communication), and identifies the media types using these characteristics. Alternatively, the processor may use any other method that automatically identifies the media type of a given data item irrespective of the protocol that is used to send it.

Figure 2:
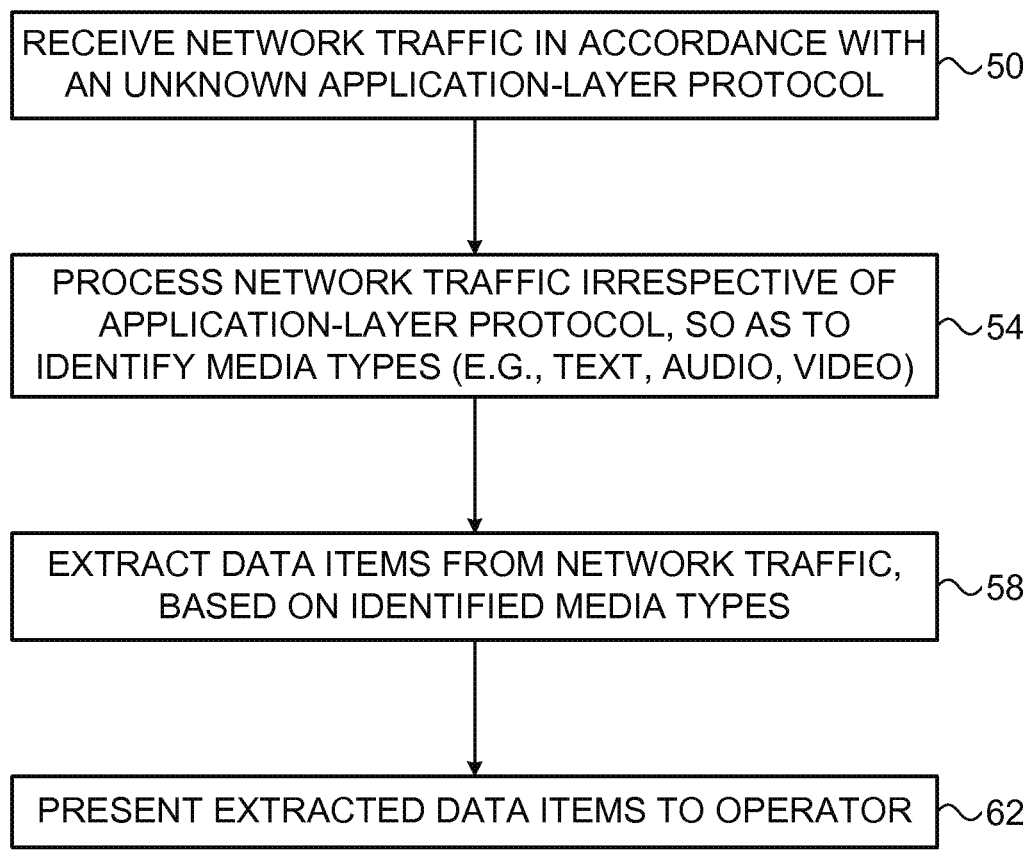
FIG. 2 is a flow chart that schematically illustrates a method for extracting media from network traffic having an unknown protocol, in accordance with an embodiment of the present disclosure.

FIG. 2 is a flow chart that schematically illustrates a method for extracting media from network traffic having an unknown protocol, in accordance with an embodiment of the present disclosure. The method begins with system 20 receiving (from network 28 via interface 32) network traffic, which complies with a protocol that is not decodable by the system, at an input step 50. Processor 36 processes the network traffic, so as to automatically identify the media types of respective data items in the traffic, at a processing step 54. As will be explained and demonstrated below, this processing is performed irrespective of the non-decodable protocol with which the traffic complies. Processor 36 extracts the data items from the network traffic, in accordance with the automatically-identified media types, at an extraction step 58. The processor presents each data item to operator 44 in accordance with its respective media type, at an output step 62.

Processor 36 may use various techniques for automatically identifying the media types of data items irrespective of the underlying protocol. For example, processor 36 may apply certain criteria to the network traffic, in order to identify segments of the traffic that contain valid textual information. Consider, for example, a segment containing a sequence of American Standard Code for Information Interchange (ASCII) characters. In some embodiments, processor 36 identifies such a segment as valid if it meets one or more filtering criteria. Filtering criteria may regard the segment as valid, for example, if the segment is longer than a predefined minimal length, if the segment contains at least a predefined number or ratio of letters (as opposed to digits and other text characters), if the segment contains only valid displayable characters, and/or if the segment contains at least one consecutive run of alphanumerical characters (letters or digits). Additionally or alternatively, any other suitable filtering criteria can be used.

Additionally or alternatively, processor 36 may compute a statistical property of the byte values in the segment, and regard the segment as valid only if the statistical property is met. For example, processor 36 may regard the segment as valid text if the occurrence frequency of commas, space characters and/or other characters is within a specified range. As another example, processor 36 may regard the segment as valid text if the byte values in the segment are sufficiently random, e.g., sufficiently distributed over the range of possible values. A long sequence of the letter "A", for example, will not be considered valid text according to the latter criterion.

As yet another example of statistical analysis, processor 36 may have a-priori knowledge as to the statistical distribution of text character values in different languages. In some embodiments, the processor assesses the statistical distribution (e.g., histogram) of byte values in the segment, and regards the segment as valid text if the assessed distribution matches the known distribution of a given language. In an embodiment, processor 36 may be configured to expect a particular language, and therefore regard a segment as valid text if the assessed distribution matches the distribution of that particular language.

In practice, different protocols may represent textual information using various character sets, such as ASCII, 8-bit Unicode Transformation Format (UTF-8), 16-bit UTF (UTF-16), Windows-1255, or any other suitable character set. In some embodiments, processor 36 identifies a traffic segment as containing text if all the byte values in the segment comprise valid character values of a given character set. This technique is useful, for example, when the character set uses byte values that all fall in a specific range of the possible byte values.

In some cases, however, a given character set uses byte values that are distributed over the entire range of possible values (e.g., 0-255). In such cases, additional criteria, such as language-dependent criteria, may be used to identify valid text segments.

For example, processor 36 may assume that a valid text segment is written in a single language. Therefore, if a segment is found to contain one or more characters that are specific to a certain language, and also one or more characters that are specific to another language, processor 36 may regard this segment as unlikely to be valid text. Note that certain characters may be specific to two or more languages. Detecting a character of this sort may indicate that the segment is written in one of the languages in which the detected character is defined. In some embodiments, processor 36 is configured to search for one or more specific languages. When attempting to determine a valid text segment, the processor may attempt to match the character set and/or statistical properties of the byte values only to those specific languages.

Additionally or alternatively, processor 36 may filter a segment of a given character set (e.g., UTF-8 or UTF-16) by applying any of the filtering criteria that were described above with respect to the ASCII character set.

The description above referred to automatic identification of textual information in the network traffic, irrespective of the underlying protocol. Additionally or alternatively, processor 36 may automatically identify other media types, such as digitized audio or visual information (still images or video). In some embodiments, the processor automatically identifies a certain file type, which is associated with a respective media type. The processor may identify the file type, for example, by detecting a character sequence or pattern that is characteristic of that file type, or using any other suitable technique.

Consider, for example, JPEG files containing compressed images. A JPEG file typically comprises a header containing the character sequence ("JFIF"). Upon detecting this character sequence, processor 36 may deduce that the traffic in question comprises a JPEG file. The processor may synchronize with the file header using the identified "JFIF" sequence, extract the image attributes (e.g., image size), and extract the image media (content) from the file. The processor may also verify whether the extracted media indeed complies with the JPEG format.

In some embodiments, processor 36 automatically identifies data items comprising encrypted information. In the present context, encrypted information is also regarded as a distinct media type. The processor may identify encrypted content, for example, by examining the entropy level (or other measure of randomness) of the byte stream. In some embodiments, processor 36 automatically identifies data items comprising compressed information (e.g., using GZIP or other compression technique). In other words, compressed data may also be regarded as a media type.

The above-described techniques are provided herein purely by way of example. In alternative embodiments, processor 36 may use any other method to automatically identify the media type of respective traffic segments, irrespective of the protocols used to send these segments. In some embodiments, processor 36 is constructed in a modular configuration for identifying multiple media types. For example, processor 36 may comprise multiple plug-in software modules, each plug-in module configured to identify a specific media type. Typically, plug-in modules can be added or removed as appropriate.

In some embodiments, system 20 presents each segment to operator 40 using a modality that matches its respective identified media type. Typically, processor 36 selects a modality for presenting the segment responsively to the identified media type of the segment, and presents the data item to the operator using the selected modality. For example, traffic segments identified as text are displayed alphanumerically on display 44. Traffic segments identified as still images or video are displayed graphically on display 44 according to their identified formats. Traffic segments identified as audio are sounded to operator 40 using a suitable speaker or headset (not shown in the figures).

As a result, the operator is able to access useful information in the identified segments in an efficient manner. Without the disclosed techniques, the operator would need to manually review streams of bytes belonging to non-decodable protocols. Such a manual process is extremely time-consuming, error-prone and inefficient. The disclosed techniques enable the operator to review, analyze, filter, prioritize and extract useful information from large volumes of network traffic, even though the underlying protocols may not be decodable.

In alternative embodiments, system 20 may present the traffic segments to the operator using any other suitable technique. For example, if a given segment is detected more than once in the traffic, the system may present a summary that shows the segment only one (possibly together with the number of detected occurrences). In an example embodiment, the segments may be presented stream-by-stream, i.e., grouped by the traffic streams from which they originate. In an alternative embodiment, the segments can be presented jointly for all streams. For example, a recurring segment can be presented together with indications of the streams in which it appears. As yet another example, the system may present the original ("raw") data and the decoded data in different colors.

Although the embodiments described herein mainly address test equipment applications, the principles of the present disclosure can also be used for QoS applications, DRM applications and various other applications.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

What is claimed is:

1. A method comprising:
receiving, in a computerized analysis system, a segment of network traffic that is exchanged between network users, wherein the segment of network traffic complies with an unknown protocol and carries part of a data item of a respective media type, wherein the unknown protocol is associated with a layer that is higher than layer 4 of the Open System Interconnection (OSI) reference model, wherein the computerized analysis system is not a designated participant in the network traffic;
automatically identifying the media type by processing the segment of network traffic as a sequence of bytes without decoding the unknown protocol and detecting in the sequence of bytes a characteristic that is indicative of the respective media type; and
extracting at least the part of the data item responsively to the identified media type, wherein extracting the data item comprises selecting a modality for presenting the data item responsively to the identified media type, and presenting the extracted data item to an operator using the selected modality, wherein automatically identifying the media type comprises one of identifying that the sequence of bytes comprises valid text or identifying in the network traffic a file type that is associated with the media type.

2. The method according to claim 1, wherein identifying the valid text comprises identifying a character set that is used for constructing the sequence of bytes.

3. The method according to claim 1, wherein identifying the valid text comprises verifying at least one criterion selected from a group of criteria consisting of:
the sequence is longer than a predefined minimal length;
at least a predefined portion of the bytes in the sequence represent letters;
the sequence comprises only bytes representing valid displayable characters; and
the sequence comprises at least one consecutive run of multiple alphanumerical characters.

4. The method according to claim 1, wherein identifying the valid text comprises assessing a statistical property of the bytes, and identifying that the text is valid responsively to the assessed statistical property.

5. The method according to claim 4, wherein assessing the statistical property comprises assessing an occurrence frequency of a given character in the sequence of the bytes.

6. The method according to claim 4, wherein assessing the statistical property comprises assessing a measure of randomness of the sequence of the bytes.

7. The method according to claim 4, wherein assessing the statistical property comprises comparing a first statistical distribution of the bytes in the sequence with a second statistical distribution of characters in a given language.

8. The method according to claim 1, wherein identifying the file type comprises detecting a byte pattern that is characteristic of the file type.

9. The method according to claim 1, wherein presenting the data item to the operator using the selected modality includes sounding out audio to the operator using a speaker or headset upon the media type of the data item being identified as audio.

10. An apparatus, comprising:
an interface configured to receive a segment of network traffic that is exchanged between network users, wherein the segment of network traffic complies with an unknown protocol and carries part of a data item of a respective media type, and wherein the unknown protocol is associated with a layer that is higher than layer 4 of the Open System Interconnection (OSI) reference model, wherein the apparatus is not a designated participant in the network traffic; and
a processor, which is configured to automatically identify the media type by processing the segment of network traffic as a sequence of bytes without decoding the unknown protocol, detect in the sequence of bytes a characteristic that is indicative of the respective media type, to extract at least the part of the data item responsively to the identified media type, and present the extracted data item to the operator using the selected modality, wherein the processor configured to automatically identify the media type comprises one of the processor conjured to identify that the sequence of bytes comprises valid text or the processor conjured to identify in the network traffic a file type that is associated with the media type.

11. The apparatus according to claim 10, wherein the processor is configured to identify the valid text by identifying a character set that is used for constructing the sequence of bytes.

12. The apparatus according to claim 10, wherein the processor is configured to identify the valid text by verify at least one criterion selected from a group of criteria consisting of:
the sequence is longer than a predefined minimal length;
at least a predefined portion of the bytes in the sequence represent letters;
the sequence comprises only bytes representing valid displayable characters; and
the sequence comprises at least one consecutive run of multiple alphanumerical characters.

13. The apparatus according to claim 10, wherein the processor is configured to sound out audio to the operator using a speaker or headset upon the media type of the data item being identified as audio by the processor.

14. A non-transitory computer-readable medium having stored thereon instructions that, when executed by a computerized analysis system, direct the analysis system to execute the process comprising the steps of:
receiving, in the computerized analysis system, a segment of network traffic that is exchanged between network users, wherein the segment of network traffic complies with an unknown protocol and carries part of a data item of a respective media type, and wherein the unknown protocol is associated with a layer that is higher than layer 4 of the Open System Interconnection (OSI) reference model, wherein the computerized analysis system is not a designated participant in the network traffic;
automatically identifying the media type by processing the segment of network traffic as a sequence of bytes without decoding the the unknown protocol and detecting in the sequence of bytes a characteristic that is indicative of the respective media type; and
extracting at least the part of the data item responsively to the identified media type, wherein extracting the data item comprises selecting a modality for presenting the data item responsively to the identified media type, and presenting the extracted data item to an operator using the selected modality, wherein automatically identifying the media type comprises one of identifying that the sequence of bytes comprises valid text or identifying in the network traffic a file type that is associated with the media type.

15. The non-transitory computer readable medium according to claim 14, wherein identifying the valid text comprises identifying a character set that is used for constructing the sequence of bytes.

16. The non-transitory computer readable medium according to claim 14, wherein identifying the valid text comprises verifying at least one criterion selected from a group of criteria consisting of:
the sequence is longer than a predefined minimal length;
at least a predefined portion of the bytes in the sequence represent letters;
the sequence comprises only bytes representing valid displayable characters; and
the sequence comprises at least one consecutive run of multiple alphanumerical characters.

* * * * *